Figure 1:
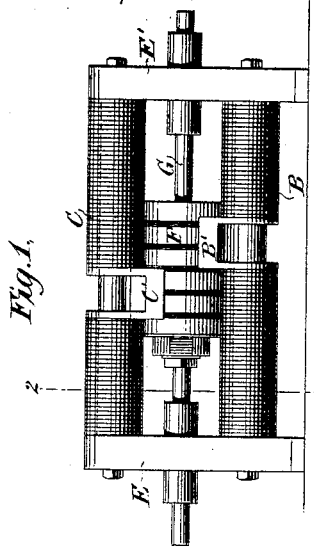

(No Model.) 4 Sheets—Sheet 1.

J. W. EASTON.
METHOD OF AND APPARATUS FOR REGULATING DYNAMO ELECTRIC GENERATORS OR MOTORS.

No. 570,663. Patented Nov. 3, 1896.

Witnesses
Edward Thorpe
W. W. Shaw

Inventor
James W. Easton.
By his Attorneys
Murphey & Metcalf.

(No Model.) 4 Sheets—Sheet 2.
J. W. EASTON.
METHOD OF AND APPARATUS FOR REGULATING DYNAMO ELECTRIC GENERATORS OR MOTORS.

No. 570,663. Patented Nov. 3, 1896.

Witnesses
Edward Thorpe
W. W. Shaw

Inventor
James W. Easton,
By his Attorneys
Murphey & Metcalf (No Model.) 4 Sheets—Sheet 3.
J. W. EASTON.
METHOD OF AND APPARATUS FOR REGULATING DYNAMO ELECTRIC GENERATORS OR MOTORS.
No. 570,663. Patented Nov. 3, 1896.
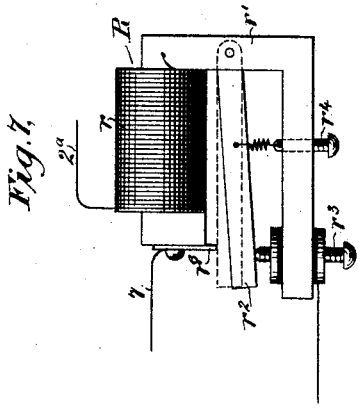
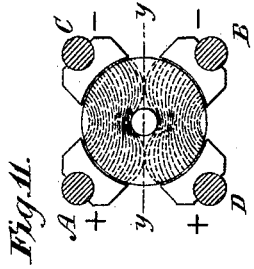
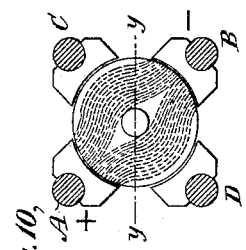
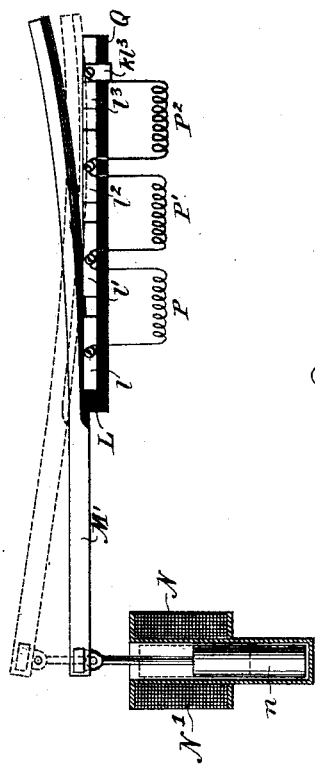
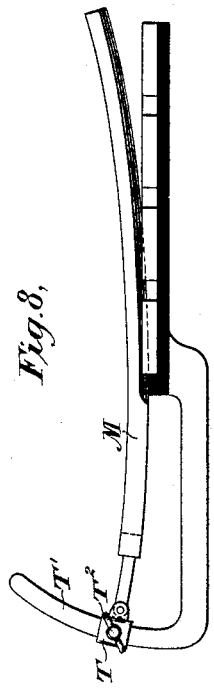
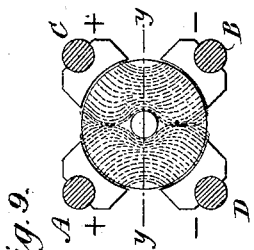
Witnesses
Edward Thorpe
W. W. Shaw
Inventor
James W. Easton
By his Attorneys
Murphey & Metcalf (No Model.)
J. W. EASTON.
METHOD OF AND APPARATUS FOR REGULATING DYNAMO ELECTRIC GENERATORS OR MOTORS.
No. 570,663.
4 Sheets—Sheet 4.
Patented Nov. 3, 1896.
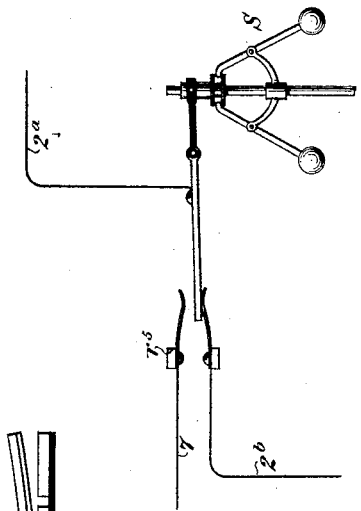
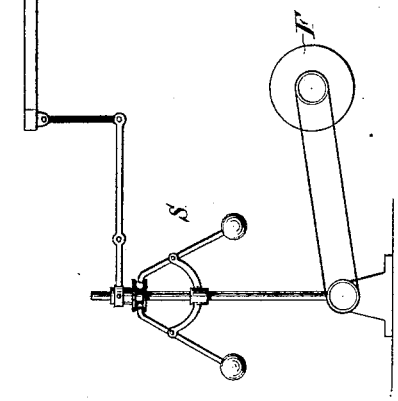
Witnesses
Edward Thorpe.
W. W. Shaw.
James W. Easton Inventor
By his Attorneys.
Murphey & Metcalf

UNITED STATES PATENT OFFICE.

JAMES WATSON EASTON, OF BROOKLYN, NEW YORK, ASSIGNOR, BY DIRECT AND MESNE ASSIGNMENTS, TO LEWIS H. SLAGHT, OF WATERFORD, CANADA, AND SAMUEL G. METCALF, OF NEW YORK, N. Y.

METHOD OF AND APPARATUS FOR REGULATING DYNAMO-ELECTRIC GENERATORS OR MOTORS.

SPECIFICATION forming part of Letters Patent No. 570,663, dated November 3, 1896.

Application filed April 1, 1892. Serial No. 427,366. (No model.)

*To all whom it may concern:*

Be it known that I, JAMES WATSON EASTON, a subject of Her Majesty the Queen of Great Britain, and a resident of the city of Brooklyn, Kings county, New York, have made certain new and useful Improvements in Apparatus for the Regulation of Dynamo-Electric Generators or Motors, of which the following is a full, clear, and exact description, reference being had to the accompanying drawings, forming part of this specification.

My invention relates to the regulation of dynamos and motors and to apparatus for carrying the same into effect. Various methods and devices have heretofore been designed to accomplish this result, but none have proved entirely successful. These, for the purpose of convenient reference, may be divided into three general classes, namely, those in which the regulation is sought to be attained by variations of speed in the moving coils of the machine, those in which it is sought to be attained by varying the position of the collecting-brushes on the commutator, and those in which it is sought to be attained by varying the power of all the field-magnets or inductors uniformly. Those methods and devices which appertain to the first class are so cumbrous as to be impracticable when applied to dynamos, and are of course entirely inapplicable to motors. In those of the second class it is difficult, if not impossible, to prevent sparking or flashing at the brushes, and, moreover, in the methods depending on the operation of devices of both these classes there is no reduction in the internal resistance of the machines, which therefore become ineffectual and wasteful converters of energy when operating on light external resistances or loads. The methods depending on devices of the third class are simple and would perhaps be reliable but for the tendency to sparking or flashing at the brushes, and which, especially in machines of the "closed-coil" type, cannot be entirely obviated.

The object of my invention is to regulate the electromotive force of a dynamo in such manner that the amperage thereof shall remain normal or substantially uniform irrespective of the speed of rotation or resistances in the external circuit, and likewise to so regulate the counter electromotive force of electromotors that a normal or substantially uniform speed shall be maintained irrespective of load or variations in the operating current; and to this end it consists, in general terms, in the combination, with a machine of the character described provided with a plurality of inductors or poles arranged in sets, of circuit-controlling mechanism for varying or changing the power or polarity of one set of inductors independently of the others.

My invention also consists in certain novel means and mechanism and arrangement and combination of parts and connections hereinafter described, and specifically pointed out in the claims.

Figure 2:
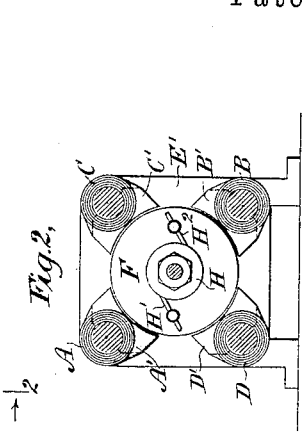
Figure 4:
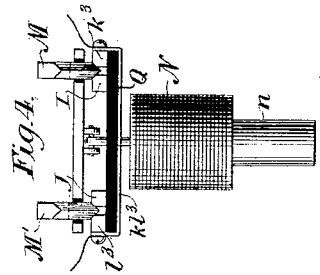
Figure 3:
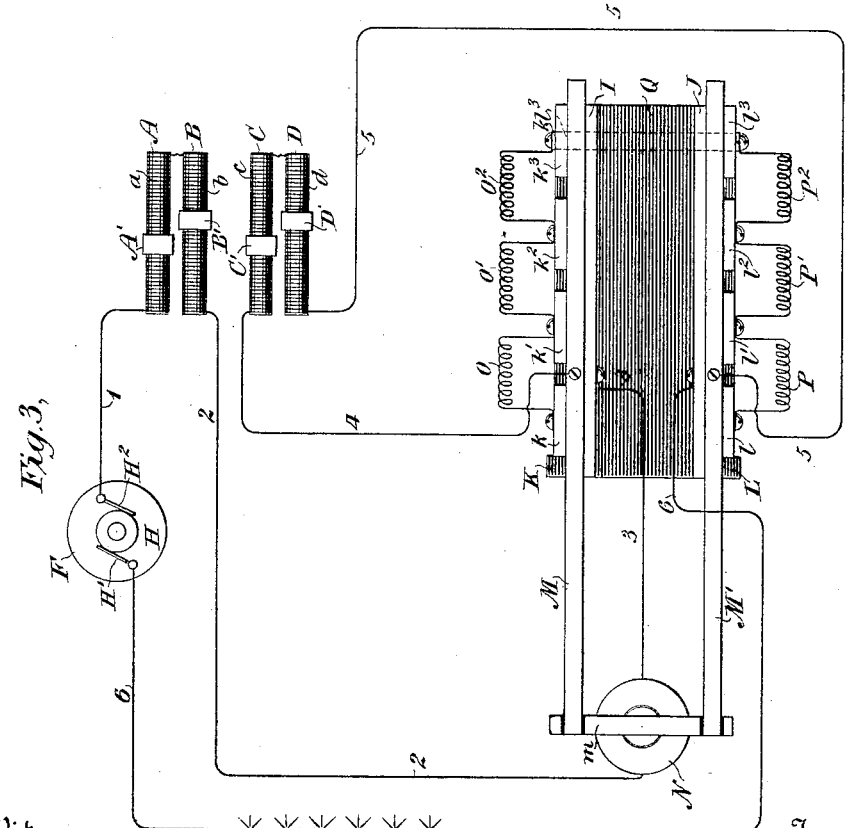

In the accompanying drawings, Figure 1 is a side elevation of a generator or motor constructed to carry out my invention. Fig. 2 is a transverse sectional elevation of said machine on the line 2 2, Fig. 1. Fig. 3 is a diagrammatic view showing the arrangement and winding of the inductors of a dynamo, the circuits, and an automatic regulator employed in carrying out my invention. Fig. 4 is a cross-sectional elevation of the automatic regulator. Fig. 5 is a diagrammatic view similar to Fig. 3, except that means are therein shown for reversing the direction and varying the strength of the reversed current in coils $c$ and $d$ and also showing an automatic circuit-controlling device not shown in Fig. 3. Fig. 6 is a side elevation of the regulator shown in Fig. 3, the circuits being omitted for the sake of clearness in Figs. 4 and 6. Fig. 7 is a side elevation of the automatic controller, showing a modified construction. Fig. 8 is a side elevation of the regulator, showing a manually-operated device. Figs. 9, 10, and 11 are diagrammatic views of the field of force, indicating the theoretical distribution of the lines of force under varying conditions. Fig. 12 is a side elevation of the regulator as applied to motors, and Fig. 13 is a modification of said controller as applied to motors when the regulator is operated by a solenoid.

Similar letters and figures of reference are employed to designate corresponding parts in all the views.

I will now proceed to describe my invention and its mode of operation, giving first a general description thereof in its simplest form as applied to a dynamo.

In said drawings, A represents an inductor having the polar surface or projection A′, which is excited by the coils $a$.

B is an inductor having the polar projection B′ and is excited by the coils $b$. The coils $a$ and $b$ are arranged in the main circuit of the machine, through which the full current generated by the machine flows at all times, so that the polarity of A and B remains constant and unchanged and their power under normal conditions remains substantially uniform.

C and D are inductors having polar projections C′ D′ excited by the coils $c$ and $d$, which, as shown, are also arranged in the main circuit of the machine. A shunt-circuit is arranged around the coils $c$ and $d$, and in the shunt-circuit is included a series of resistances or coils O O$^2$ and P P$^2$, the total resistance of which is considerably greater than that of the coils $c$ and $d$. The circuits and resistances are so arranged that when the amperage of the current becomes abnormally high, for instance, by loss of resistance in external circuit or increase of speed in machine, the total resistance of said coils becomes gradually less, whereby a portion at first, and finally all the current which normally flows through $c$ and $d$, is diverted through the lower resistances in the shunt-circuit, and the power of the inductors C and D is thus gradually weakened. The intensity of the magnetic field is thereby reduced, resulting in a corresponding reduction of the electromotive force of the dynamo and consequently of the amperage of the current generated thereby. This reduction continues until the desired degree of regulation is attained or until the coils $c$ and $d$ are entirely deprived of current.

The inductors A, B, C, and D are supported in the frames E E′, of magnetic material. The armature or induced coils F are mounted on a shaft G, so as to revolve in the field of force created by the inductors A, B, C, and D, and is provided with a commutator H, upon which rest the collecting-brushes H′ H$^2$, to which the conducting-wires are attached in the usual manner.

The apparatus by which the connections with the resistances above mentioned are controlled, and which I herein designate as the "regulator," is preferably (and in the forms herein shown in Figs. 3 to 6) automatic in action. The regulator and resistances are substantially a controlled rheostat of novel form, and, as will be understood by those skilled in the art, my invention may be carried into effect by many other forms of apparatus constructed and operated in various ways. Referring now to the form thereof illustrated in Fig. 3, the apparatus is located in the main circuit and consists of the metallic bars I and J, of good conductivity, supported on an insulated or insulating base Q. Outside of the bars I J are arranged the insulating-blocks K L and the contact-plates $k$ $k'$ $k^2$ $k^3$ and $l$ $l'$ $l^2$ $l^3$, respectively, so as to leave a narrow channel of uniform width between all the plates $k$ to $k^3$ and the bar I and between all the plates $l$ to $l^3$ and the bar J. These bars and plates are all insulated from each other except by the conductors and coils, as hereinafter specified.

A curved rocking connector-blade M (substantially V-shaped in cross-section) is arranged to rest in the channel between the bar I and the plates $k$ to $k^3$. This blade is made of metal of good conducting properties and is given the proper degree of curvature, so that when rocked it will establish a shifting contact along its length with the contact-bar I and contact-plates $k$ to $k^3$, (the point of such contact depending on the position to which the blade M may be rocked,) but will never contact with more than two of the plates $k$ to $k^3$ at the same instant. A similar blade M′ rests in the channel between the contact-bar J and the contact-plates $l$ $l'$ $l^2$ $l^3$, and the two blades M and M′ are firmly connected together by the cross-head $m$. They are properly insulated from each other and move together. A bar or rod $k l^3$, of conducting metal, contacts with and connects the contact-plates $k^3$ and $l^3$ and furnishes for the current a path of very low resistance across the regulator when the blades M M′ are in contact with said plates.

A series of resistance-coils O O′ O$^2$ P P′ P$^2$, above referred to, are arranged on opposite sides of the regulator. One terminal of the coil O is electrically connected with the contact-plate $k$ and the opposite end thereof with the next plate $k'$. The next coil O′ is of less resistance than coil O, and one terminal thereof is connected with the contact-plate $k'$, and the other terminal thereof is connected with the contact-plate $k^2$. The next coil O$^2$ is of less resistance than the coil O′, and one terminal thereof is connected with the contact-plate $k^2$ and the other terminal with the contact-plate $k^3$. The coils P P′ P$^2$ on the opposite side of the regulator are arranged and connected to the contact-plates $l$ to $l^3$ in a corresponding manner, their resistance gradually decreasing from $l$ to $l^3$, as in the case of the opposite coils.

The cross-head $m$ is pivotally connected with the core $n$ of a solenoid N, of which the coils N′ are in the main circuit. The solenoid N and cross-bar $m$ are so proportioned, adjusted, and arranged that when the coils N′ are normally energized the connector-blades M M′ will be supported between the ends of the contact-bars I J and the insulating-pieces K and L and, owing to their curved shape, will not contact with any of the contact-plates $k$ to $k^3$ or $l$ to $l^3$; but when the current flowing through the coil N′ becomes abnormally increased, as by loss of resistance in external circuit or increase of speed of machine, the core $n$ will be drawn up into the coils, thereby lifting the cross-head $m$ and that end of the blades M M' and shifting the resting-point of the blades toward their opposite ends, thereby (as core $n$ is raised) successively bringing the bars I J into metallic contact with the contact-plates $k$ to $k^3$ and $l$ to $l^3$, respectively.

Still having reference to Fig. 3, the arrangement of circuits which I employ in carrying my invention into effect is as follows: The coils $a$ and $b$ are electrically connected with the brush H² of the dynamo by a conductor 1 and with the coils N' of the solenoid N by the conductor 2. The coils N' are connected with the contact-bar I (which is always in contact with the blade M) by the conductor 3. The blade M is connected with the coils $c$ and $d$ by the conductor 4. A conductor 5 connects the coils $c$ and $d$ with the connector-blade M' (which is always in contact with bar J) and the bar J is connected to the lamps X and brush H' by the conductor 6.

Now assuming that the machine is operating at normal speed over maximum external resistance the current flowing through coil N' of the solenoid will not be of sufficient strength to lift the core $n$ and blades M M', which are of course properly weighted or balanced to overcome the attraction exerted by said coils on the core $n$ when maximum external resistance is in circuit. The connector-blades M and M' will therefore occupy the position shown in full lines in Fig. 6; that is to say, the blade M will rest upon the end of bar I and upon the insulating-piece K and the blade M' will rest upon the end of bar J and upon the insulating-piece L, and the current collected by brush H² will therefore flow through coil $a$, through coil $b$, thence by conductor 2 to coil N' of solenoid N, thence through conductor 3 to contact-bar I, thence through said bar to blade M, thence to coils $c$ and $d$ by conductor 4, from coils $c$ and $d$ to blade M' by conductor 5, thence to contact-bar J, and thence through conductor 6 and lamps X to brush H'. Under these conditions all the inductors will be uniformly excited by the full current of the machine and the field of force formed thereby will be of maximum intensity, A' and C' being positive poles and B' and D' being negative.

The theoretical distribution of the lines of force in the field is indicated generally in Fig. 9, the distortion of the field produced by the rotation of the armature being disregarded in said figure for the sake of clearness. If now there be an increase in the amperage of the current, owing, for instance, to loss of external resistance caused by switching one of the lamps X out of circuit, the increase in current strength will cause the coils N' of the solenoid N to become more strongly energized and the core $n$ will be lifted or drawn farther into the coils, whereby the ends of the connector-blades M M', to which said core is connected, will be lifted and said blades will no longer rest upon the insulating-pieces K and L, but upon and in contact with the bars I J and contact-plates $k$ and $l$, respectively. The shunt-circuit of high resistance, which includes all the coils O O' O², conductor $kl^3$, and coils P P' P², will be thereby closed, but as the total resistance of all these coils is considerably higher than the resistance of the coils $c$ and $d$ the current which under normal conditions all flowed through coils $c$ and $d$ will be partially diverted and a small proportion of it will flow through the shunt-circuit containing the resistance-coils. As a portion of the current is thus diverted from the coils $c$ and $d$ the inductors C and D will be proportionally weakened, causing a corresponding reduction in the intensity of the magnetic field and in the amperage of the current. If the reduction in current thus obtained be insufficient and the electromotive force of F be still too great, the core $n$, under the attraction of coil N', will continue to rise, and the blades M M' will contact with and rest upon the contact-pieces $k'$ $l'$, respectively, whereby the coils O and P will be cut out of circuit, and as the total resistance of the shunt-circuit is thereby reduced the result will be a still further reduction in the current by the diversion of a greater proportion thereof from the coils $c$ and $d$. If a still greater reduction be necessary, the coils O' and P' and finally the coils O² P² are cut out of the shunt-circuit in like manner until the blades M M' finally rest upon the plates $k^3$ $l^3$, and a shunt-circuit of very low resistance is established through the blade M, conductor $kl^3$, and blade M', the result being that the coils $c$ and $d$ are practically deprived of current. Before this occurs, however, the coils $c$ and $d$ have been gradually rendered neutral by the diversion of current therefrom until they are of just sufficient power to prevent any lines of force from passing from A' to C' or D', and B' becomes the only negative pole of the field, as indicated by Fig. 10. This usually occurs, as I have found by experiments, at about half-load, and as still more of the current is diverted from $c$ and $d$ the inductors C and D become weaker and some of the lines of force in the field are caused to enter the poles C' D', and the cutting of these lines of reverse direction by the coils of F sets up a counter electromotive force in said coils and reduces the efficient electromotive force of the machine accordingly. This, however, occurs in the coils at a sufficient distance from the region of brush connections to prevent any tendency to sparking or flashing. This action continues until, as before stated, the coils $c$ and $d$ are completely short-circuited, or until the requisite reduction in the current is produced. If now the amperage of the current falls, as by switching one or more lights into circuit, and thereby increasing the resistance of the main circuit, the operation of the regulator above described will be reversed and the resistance of the shunt-circuit gradually increased, less of the current thereby flowing through the shunt-circuit and more through the coils $c$ and $d$ until the operation of the machine becomes normal or until the necessary increase in current is obtained.

I have found by actual practice that with the mechanism shown in Fig. 3 practically perfect regulation of the machine may be automatically attained for all loads requiring from one-fifth to the maximum current of the machine, and that within these limits no other means are necessary to effect the desired regulation; but where closer regulation is essential I provide the mechanism shown in Fig. 5 for carrying my invention into effect. In this modified form of regulator two additional contact-bars I' J', one on each side of the regulator, and six additional contact-plates, $k^4 k^5 k^6 l^4 l^5 l^6$, three on each side of the regulator, are provided, between which the elongated connector-blades M M' are adapted to form a metallic contact in the manner previously described. The contact-bar J' is electrically connected with the bar J by the conductor $j$, and the bar I' is similarly connected with the bar I by the conductor $i$. The contact-plates $k^4$ and $l^2$ are connected electrically by the conductor 11, the plates $k^5$ and $l'$ by the conductor 12, the plates $k^6$ and $l$ by the conductor 13, and the plates $l^4 l^5 l^6$ on the opposite side of the regulator are similarly connected with the plates $k^2$, $k'$, and $k$, respectively, by the conductors 14, 15, and 16. I also provide an automatic switch or circuit-controller R, which is arranged in the main circuit, and which is operated by variations in current strength of main circuit to make and break connections in a circuit in which the coils N' of the solenoid are included. This controller consists of a magnet $r$, adapted to be energized by the coils which are connected at one end with the conductor $2^a$, and of which the other terminal is electrically connected with the frame $r'$, which is preferably of iron or good conducting material. To the frame $r'$ is pivoted, so as to be in electrical contact therewith, the lever $r^2$, the outer end of which normally rests on the conducting screw or stop $r^3$, insulated from the frame $r'$. The lever $r^2$ is properly loaded, or a retractile spring $r^4$ secured thereto, so that the normal current of the main circuit will not lift the lever $r^2$; but when said current is increased, as by loss of resistance in main circuit, the magnet $r$ will lift the lever and bring it into contact with the conducting-piece $r^5$. The screw $r^3$ is connected with the contact-bar I by conductor $2^b$, and the coils N' of solenoid N are connected with the conducting-piece $r^5$ and with the conductor $2^b$ by the conductor 7. The other connections shown in Fig. 5 are the same as those shown in Fig. 3, so that a detailed description thereof is deemed unnecessary here.

The operation of the device shown in Fig. 5 will now be apparent. Assuming that the machine is operating at normal speed over maximum external resistance, the current will not be of sufficient strength to cause the magnet $r$ to lift the lever $r^2$ from screw $r^3$, and the current from brush H² will flow through coils $a$ and $b$, conductor $2^a$, and coils of magnet $r$ to frame $r'$, thence to lever $r^2$, through screw $r^3$, conductor $2^b$, and contact-bar I to connector-blade M, which (as the coils N' of solenoid $n'$ are deënergized, the circuit including them being open) will rest on insulating-piece K. From blade M the current will flow through conductor 4, coils $c$ and $d$, conductor 5, blade M' (which rests on insulating-piece L) to contact-bar J, and thence by conductor 6 through lamps X to brush H'. If now the current is abnormally increased, the magnet $r$ will attract the lever $r^2$ to the conducting-piece $r^5$, thereby closing the circuit in which the coils N' are located, and energizing said coils, and by the movement thus imparted to the connector-blades providing a path for the current through the resistance-coils and weakening the power of inductors C and D, precisely as previously described. The operation of the regulator will be precisely as heretofore described so long as, say, one-fifth of the total resistance remains in circuit, or so long as the speed does not increase above a corresponding point; but if after the coils $c$ and $d$ have been completely short-circuited the electromotive force of the current is still excessive the core $n$ of solenoid N' continues to rise, and the blades M M' will leave the contact-bars I J and contact with the bars I' J' and with the contact-plates $k^4 l^4$, whereby the coils O² P² will be thrown into the shunt-circuit around the coils $c$ and $d$, thereby increasing the resistance of the shunt-circuit sufficiently to cause a greater portion of the current to flow through said coils. This current, however, by reason of the cross connections between said bars and the bars I J, and between said plates and the plates $l^2 k^2$, will be reversed in direction, so that the polarity of the inductors energized by coils $c$ and $d$ is reversed, C' becoming a negative and D' a positive pole, as indicated in Fig. 11. If the current be still excessive, the core $n$ will rise, and the blades M M' will contact successively with the contact-plates $k^5 l^5$ and $k^6 l^6$, the coils O' P' and O P will be thrown into the shunt-circuit, and practically all the current of the machine, reversed in direction, as aforesaid, will flow through the coils $c$ and $d$, and the counter electromotive force in the induced coils produced by the cutting of the lines of force between A and C and between D and B, both direct and reverse on each side of the neutral line, will be increased and the efficient electromotive force of the current correspondingly decreased until when the blades rest on the contact-plates $k^6 l^6$ there will be only sufficient current delivered by the machine to operate and control the regulating apparatus. Upon a decrease of the current, by switching in one or more lamps, for instance, the above action of the reversing and regulating apparatus will be reversed until normal resistances are in circuit, or until the necessary regulation is attained. It will be understood, of course, that the limits of action herein described may be varied at will. That is to say, a greater number of coils and contact-plates may be and preferably are employed and the current uniformly maintained at all times, providing, of course, that sufficient energy be applied to maintain the output of the machine.

In Fig. 7 is shown a modified form of circuit-controller, in which the conducting-piece $r^5$ is dispensed with and the conductor 7 is permanently secured to the frame $r'$ in electrical contact therewith. The resistance of the circuit formed by conductor 7 and coils N' is arranged to be relatively higher than the circuit through $r'$, $r^2$, $r^3$, and $2^b$, so that when the lever $r^2$ is in contact with screw $r^3$ very little current will flow through the high-resistance circuit 7 and coils N'—not enough to energize them; but when by an increase in current the lever $r^2$ leaves the screw $r^3$ the increased current will flow through conductor 7 and coils N', thereby operating the regulator in the manner previously described. A stop $r^6$ is suitably secured to the magnet to prevent the lever $r^2$ from contacting with the pole of the magnet.

My invention is equally applicable to the regulation of a current supplied to motors as to the regulation of the current generated by a dynamo. In carrying it into effect in motor regulation the inductors are wound and arranged in the same manner as in the case of the dynamo, the brushes being properly placed and arranged; but in the form of apparatus shown in Fig. 3 the solenoid N is replaced by a speed-actuated governing device S, Fig. 12, which may be of any approved form and which is actuated by changes of speed in the moving coils F of the motor. The connector-blades M M' are connected with the governor in any suitable manner, so as to be actuated by changes of speed in the machine, as will be readily understood. Instead, however, of actuating the blades M M' directly by the governor S, I employ, where closer regulation is desired, a solenoid N for actuating said blades, as shown in Fig. 5, and substitute the governor S for the controller R (shown in said Fig. 5) for the purpose of making and breaking connections with the circuit comprising the coils of the solenoid, as shown in Fig. 13.

In Fig. 8 is shown a hand-operated regulator in which a pivoted clamp T is attached to the connector-blades and is arranged to slide on the curved bar T'. This permits the blades M M' to be moved to any position desired to produce desired regulation, and when adjusted the blades are fastened in position by the set-screw $T^2$.

Various well-understood modifications may be made in the construction of the apparatus herein shown and described, such, for instance, as the substitution of electromagnets having a pivoted armature for that form which is provided with an axial core, and which are usually termed "solenoids;" but as these modifications are all within the knowledge of any skilled electrician it is unnecessary to give a more detailed description thereof, although it is perhaps proper to say that in the claims I employ the term "electromagnet" to designate broadly all forms of electromagnets.

From the foregoing description of my invention it is obvious that the power of a portion of the inductors A and B remains substantially uniform at all times. By the term "substantially uniform" I mean to have it understood that their power is not appreciably affected by the regulating apparatus where the current is sufficient under normal conditions to energize the magnets above saturation-point; or, in other words, the term "substantially uniform" as herein employed in referring to the power of the inductors is intended to designate such a condition of the inductors as is produced by causing the full current generated or used by the machine to pass through their energizing-coils or a condition analogous thereto if produced by other means, it not being my intention to limit the meaning of the term to the condition produced by the exact form of mechanism shown in the drawings, because permanent magnets or separately-excited inductors might be employed in place of inductors A and B without departing from my invention, nor to limit it to the maintenance of an absolutely uniform and unvarying power of the inductors, because their power might vary within slight and immaterial limits before regulation was effected, especially if the inductors were not fully saturated; but their power nevertheless would be substantially uniform as compared with the widely-varying power of the other inductors.

One important feature of my invention is its adaptability to motors as well as dynamos, to either open or closed coil machines, and to machines having rotating inductors and stationary induced coils. Indeed it may be employed in connection with almost any type or form of continuous-current machine so long as there are a sufficient number of inductors to permit the power of a portion of them to be maintained substantially uniform, while the others are varied in power or varied in power and reversed in polarity in accordance with variations in the load (or resistance) or in the "output" of the machine, which latter term I employ herein to designate (in the case of a dynamo) variations in the volume of current or (in the case of a motor) in the power generated by the machine. I prefer, however, to employ four inductors arranged as herein shown and described, and as high pressure is customary in the use of currents of uniform amperage I prefer the use of those types of armatures or induced coils in which the coils are arranged in a ring form, because the tension of each bobbin is low and the tension at the brushes is high, and greater security against injury to the machine from the high tension of the current is thus provided. It will also be obvious that the brushes may be fixed permanently in position, and after proper adjustment will require no further attention. For dynamos the theoretical position of the brushes or the diameter of commutation is indicated by the line $y\,y$, Figs. 9, 10, and 11, the distortion of the field and its effect on the position of the brushes being here disregarded for the sake of clearness, but this will be readily understood and allowed for by those skilled in the art.

Not only do the brushes require no shifting or attention, but all flashing and sparking is absolutely prevented, and the current strength is practically uniform and under perfect control.

The term "varying or changing the current" is used in the claims to indicate either variations in the volume or magnetizing effect of the current or changes in the direction thereof.

Having thus described my invention, what I claim as new, and desire to secure by Letters Patent, is—

1. The combination with a dynamo or motor having a plurality of pole-pieces arranged in sets or divisions, of a circuit-controlling device actuated by variations in the output or load of the machine for varying or changing the power or polarity of one set of pole-pieces independently of the others, substantially as shown and described.

2. The combination of a dynamo-electric generator or motor having a plurality of poles arranged in sets, the coils of which are all in the main circuit, with means for varying or changing the current in the coils of one set of poles independently of the others, substantially as shown and described.

3. The combination of a dynamo-electric generator or motor having a plurality of poles arranged in sets, the coils of which are all in the main circuit, with mechanism actuated by variations in the output of the machine for varying or changing the current in the coils of one set of poles independently of the others, substantially as shown and described.

4. The combination with a dynamo-electric generator or motor having a plurality of poles arranged in sets of mechanism actuated by variations in the output or load of the machine for varying the magnetizing effect and changing the polarity of one set of poles independently of the others, substantially as shown and described.

5. The combination with a dynamo-electric generator or motor having a plurality of poles arranged in sets, the coils of which are all in the main circuit, of resistances arranged in a shunt-circuit around the coils of one set of poles and mechanism substantially as described, for opening and closing said shunt-circuit, substantially as shown and described.

6. The combination with a dynamo-electric generator or motor having a plurality of poles arranged in sets, of a shunt-circuit around one set of poles, and of mechanism actuated by variations in the output or load of the machine for varying the resistance of said shunt-circuit, substantially as shown and described.

7. The combination with a dynamo-electric generator or motor having a plurality of poles arranged in sets, of a shunt-circuit around one set of poles and a circuit-controlling device, actuated by variations in the output or load of the machine, for controlling the volume of the current in the shunt-circuit and the direction of the current in the coils of one set of poles, substantially as shown and described.

8. In combination with a dynamo-electric generator or motor having a plurality of poles arranged in sets, of a series of resistances in shunt relation to the coils of one set of poles, a movable circuit-closer for throwing said resistances into and out of circuit successively, an electromagnet in the main circuit of the machine and arranged to actuate said circuit-closer by variations in the volume of the current passing through the coils, substantially as shown and described.

9. In combination with a dynamo-electric generator or motor having a plurality of poles arranged in sets, of a series of resistances in shunt relation to the coils of one set of poles, a movable circuit-closer for throwing said resistances into and out of circuit successively, an electromagnet arranged to actuate said circuit-closer, and an automatic switch arranged to vary the volume of current in the coils of the electromagnet in accordance with variations in the output or load of the machine, substantially as shown and described.

10. In an electric-current regulator the combination of a series of resistances, curved connector-blades arranged to make and break connections between the external circuit and the resistance-coils, an electromagnet N connected with said blades, and an automatic switch arranged in the main circuit of the machine to vary the strength of the current flowing through the coils of N in accordance with variations in volume of current in the main circuit, substantially as shown and described.

JAMES WATSON EASTON.

Witnesses:
S. G. METCALF,
W. W. SHAW.